United States Patent
Kamata et al.

(10) Patent No.: US 7,323,258 B2
(45) Date of Patent: Jan. 29, 2008

(54) MAGNETIC RECORDING MEDIUM AND METHOD FOR MANUFACTURING THE SAME

(75) Inventors: Yoshiyuki Kamata, Tokyo (JP); Yuichi Ohsawa, Kanagawa-Ken (JP); Hiroyuki Hieda, Kanagawa-Ken (JP); Akira Kikitsu, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 10/947,132

(22) Filed: Sep. 23, 2004

(65) Prior Publication Data

US 2005/0069732 A1    Mar. 31, 2005

(30) Foreign Application Priority Data

Sep. 30, 2003   (JP)   ............... 2003-341304

(51) Int. Cl.
  *G11B 5/64*   (2006.01)
  *G11B 5/39*   (2006.01)
  *B32B 15/04*   (2006.01)

(52) U.S. Cl. .............. 428/827; 428/835; 427/131; 360/135

(58) Field of Classification Search ........ 428/826, 428/827, 828, 834, 835, 835.1, 835.2, 408; 427/131; 360/16, 135, 136; 118/728
See application file for complete search history.

(56) References Cited

U.S. PATENT DOCUMENTS

| | | | |
|---|---|---|---|
| 5,956,216 A | | 9/1999 | Chou |
| 6,171,676 B1 | | 1/2001 | Mukai et al. |
| 6,433,944 B1 | * | 8/2002 | Nagao et al. ............... 360/16 |
| 6,595,506 B1 | * | 7/2003 | Zide et al. ............... 118/728 |
| 2003/0190476 A1 | * | 10/2003 | Veerasamy et al. ......... 428/408 |
| 2004/0091748 A1 | | 5/2004 | Kamata et al. |
| 2004/0131890 A1 | * | 7/2004 | Kikitsu et al. ............. 428/835 |
| 2004/0191577 A1 | * | 9/2004 | Suwa et al. ............... 428/835 |
| 2006/0021966 A1 | | 2/2006 | Hattori et al. |

FOREIGN PATENT DOCUMENTS

| | | |
|---|---|---|
| JP | 04-274001 | 9/1992 |
| JP | 7-85406 | 3/1995 |
| JP | 2001-176049 | 6/2001 |
| JP | 2005-050468 | 2/2005 |
| JP | 2005-108335 | 4/2005 |

OTHER PUBLICATIONS

Abstract JA 2005-108335.*

* cited by examiner

*Primary Examiner*—Carol Chaney
*Assistant Examiner*—Louis Falasco
(74) *Attorney, Agent, or Firm*—Oblon, Spivak, McClelland, Maier & Neustadt, P.C.

(57) ABSTRACT

A magnetic recording medium which allows high density recording and has excellent durability can be obtained. A magnetic recording medium includes: a plurality of ferromagnetic material dots arranged on a soft magnetic layer formed on a non-magnetic substrate so as to be separated from one another; and carbon films which are formed on the respective ferromagnetic material dots, each carbon film having a smooth film face shape in a section passing through the center of each ferromagnetic material dot and a film thickness gradually decreasing from the center of the ferromagnetic material dot toward an outer edge thereof.

13 Claims, 12 Drawing Sheets

CURVATURE DEFINITION  a/b ≦ 0.9

MAGNETIC RECORDING MEDIUM AND METHOD FOR MANUFACTURING THE SAME

CROSS-REFERENCE TO RELATED APPLICATION

This application is base upon and claims the benefit of priority from prior Japanese Patent Application No. 2003-341304, filed on Sep. 30, 2003 in Japan, the entire contents of which are incorporated herein by reference.

BACKGROUND OF THE INVENTION

1. Field of the Invention

The present invention relates to a magnetic recording medium which allows high density magnetic recording and a method for manufacturing the same.

2. Related Art

In recent years, multimedia for data such as image, video, sound progresses, which results in increase in information or data volume of retrieval data per one user. For this reason, mass volume of database and fast processing are required. On the other hand, according to improvement of surface recording density of a magnetic recording medium due to increase in recording volume of HDD (Hard Disk Drive), each recording bit size on the magnetic recording medium becomes extremely fine such as several tens nanometer. In order to obtain a reproduction output from such a fine recording bit, it is required to secure large saturation magnetization and film thickness as much as possible for each bit. However, fineness of the recording bit makes a magnetization amount per bit small, which causes such a problem as disappearing of magnetized information or data due to magnetization reversal due to "thermal fluctuation".

Generally, the influence of the "thermal fluctuation" becomes larger as the value of $Ku \cdot V/(k \cdot T)$ becomes smaller. Here, Ku represents magnetic anisotropy energy density, V represents magnetizing minimum unit volume, k represents Boatman's constant, and T represents absolute temperature. Experiential, it is said that, when $Ku \cdot V/(k \cdot T)$ becomes less than 100, magnetization reversal due to the "thermal fluctuation" occurs. That is, the magnetic anisotropy energy required for maintaining orientation of magnetization of magnetic particles in one direction is expressed by a product of the magnetic anisotropy energy density Ku and the volume V of the magnetic particles, but when $Ku \cdot V/(k \cdot T)$ becomes less than 100, the magnetic anisotropy energy required for maintaining orientation of magnetization of magnetic particles in one direction becomes about thermal fluctuation energy at the room temperature. Therefore, such a phenomenon occurs that magnetization fluctuates according to time elapsing and recorded information or data disappears.

In a magnetic recording medium of a longitudinal magnetic recording system, since a demagnetizing field in the recording bit in a high recording density region becomes strong, magnetized information or data is apt to be influenced by the "thermal fluctuation" even while a magnetic particle diameter is relatively large. On the other hand, in a magnetic recording medium of a perpendicular magnetic recording system, since the magnetized minimum unit volume V can be made large while particle diameter on a medium surface remains small by causing magnetic particles to grow in a direction of the film thickness, the influence of the "thermal fluctuation" can be suppressed. However, when high density of the magnetic recording medium further advances in the future, a limit will appear in robustness to the "thermal fluctuation" even in the perpendicular magnetic recording system.

A magnetic recording medium called "a patterned media" is getting an attention as a medium for solving the problem of resistance to this thermal fluctuation (refer to Japanese Patent Laid-Open No. 2001-176049 (FIG. 1), for example). The patterned media is, generally, a magnetic recording medium on which a plurality of magnetic regions serving as a recording bit unit are respectively formed independently in a non-magnetic layer, but it can be said to be a medium where a magnetically continuous magnetic thin film is partitioned to each recording magnetic domain size. In an ordinary patterned media, for example, such an oxide as $SiO_2$, $Al_2O_3$, $TiO_2$, or such a nitride as $Si_3N_4$, AlN, TiN, such a carbide as TiC, or such a boride as BN is used as a non-magnetic layer, and a ferromagnetic region is selectively formed in each of these non-magnetic layer.

Since the patterned media is obtained by partitioning a magnetic thin film to respective recording magnetic domain size, the magnetized minimum unit volume V can be made large, so that the problem about the thermal fluctuation can be avoided. In a conventional continuous magnetic thin film, a magnetic domain has about 1000 grains per one bit as the number of magnetic particles. However, according to advance of high recording density, the number of gains corresponding to one bit decreases. As a recording mark edge depends on a grain boundary of a gain, it becomes necessary to make the grain small as much as possible in order to secure S/N ratio. Accordingly, V must be made small in the conventional continuous film. However, in the patterned media, since an edge of the recording magnetic domain can be defined by a structure thereof, improvement in S/N ratio can be expected without making V small.

In the pattern media, ferromagnetic regions, each being a recording bit unit, are independent from one another, interference between respective recording bits can be prevented, which is effective in prevention of disappearance of record due to an adjacent bit or reduction of noises. Further, a domain wall movement resistance increases due to patterning, so that improvement of magnetic characteristics can be enhanced.

On the other hand, when a track density is improved, a problem about interference with an adjacent track is developed. In particular, reduction of writing blurring due to a recording head magnetic fringe effect is a important technical problem. Now, a discrete track media which separates recording tracks from each other physically has been proposed (refer to Japanese Patent Laid-Open No. 07-85406 (FIG. 1), for example). When the discrete track media is used, a side erase phenomenon at a recording time, a side read phenomenon where information or data pieces of adjacent tracks are mixed at a reproduction time or the like can be reduced. Since it is possible to increase a density in a track direction largely, a magnetic recording medium with a high density can be provided.

Since the patterned media must be separated in both a recording track direction and a recording line direction physically, a high level nanometer working technique is required. Since the discrete track media performs separation only in the recording track direction, patterning on the discrete track media is easier than that on the patterned media.

As described above, since the patterned media can suppress magnetization reversal due to the "thermal fluctuation", it is effective as the high density magnetic recording medium. Further, since the discrete track media can increase a density in the track direction, it is effective as the high density magnetic recording medium. However, when record is written in each of the patterned media and the discrete track media, magnetic field is concentrated on a corner of a recording track (or a recording bit) so that electrostatic discharge occurs due to sparking. Such a problem arises that a magnetic material deteriorates due to such a local electrostatic discharge, life of each of the patterned media and the discrete track media (hereinafter, called "patterned media, too) is shortened.

There is also a problem that the patterned media is inferior in lubricant application to the conventional continuous film. The lubricant (usually, perfluoropolyether) includes a portion (absorbing layer) which chemically bonds carbons formed on a magnetic recording medium surface and a portion (a free layer) which does not cause chemical bonding and is movable freely. The bonding layer becomes important for suppressing decrease/loss of lubricant due to contact or the like of the recording/reproducing head and preventing spinning-off due to centrifugal force at a disc rotation time. The free layer becomes important for flowing to a portion where the lubricant has decreased to cover the same to self-repair. In the patterned media, since the surface area of carbon formed as a protective film becomes large, the absorbing layer of the lubricant increases and the free layer decreases. Therefore, when the patterned media is used for a long period, the self-repair owing to the free layer does not overtake decrease of lubricant, so that the life of the patterned media is reduced.

Furthermore, as the cause of life reduction of the patterned media, there is an abnormal protrusion on the medium surface. In addition to such a risk that the abnormal protrusion and the recording/reproducing head collides with each other to cause failure, the recording/reproducing head and the magnetic recording medium degrades due to influence of heat generated by the collision. In the patterned media, a hard mask (usually, metal such as Ti or Ta) is used for working a magnetic material, but it is difficult to remove the hard mask and a portion of the hard mask which can not be removed causes the abnormal protrusion.

SUMMARY OF THE INVENTION

In view of the above circumstances, an object of the present invention is to provide a magnetic recording medium which allows high density recording and has an excellent durability and a method for manufacturing the same.

A magnetic recording medium according to a first aspect of the present invention includes: a plurality of ferromagnetic material dots arranged on a soft magnetic layer formed on a non-magnetic substrate so as to be separated from one another; and carbon films which are formed on the respective ferromagnetic material dots, each carbon film having a smooth film face shape in a section passing through the center of each ferromagnetic material dot and a film thickness gradually decreasing from the center of the ferromagnetic material dot toward an outer edge thereof.

A manufacturing method of a magnetic recording medium according to a second aspect of the present invention includes: forming a ferromagnetic layer on a soft magnetic layer formed on a non-magnetic substrate; forming a mask comprising carbon on the ferromagnetic layer; and performing ion milling with controlled ion incidental angle on the ferromagnetic layer using the mask comprising the carbon.

DETAILED DESCRIPTION OF THE INVENTION

Embodiments of the present invention will be explained below with reference to the drawings.

First Embodiment

Figure 1:
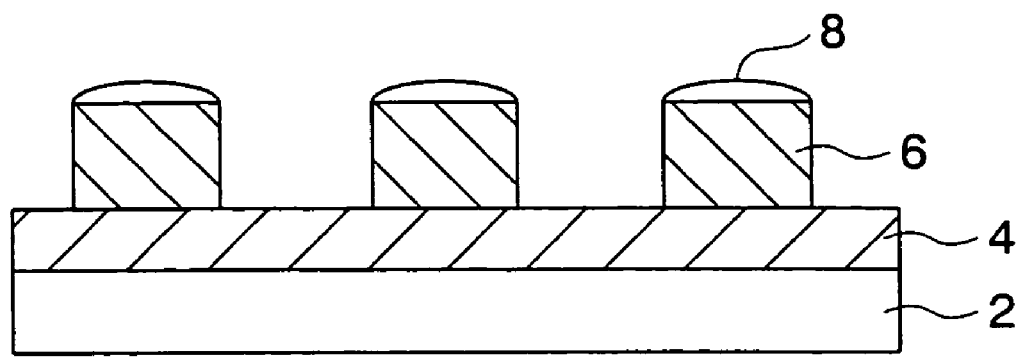
FIG. 1 is a sectional view showing a constitution of a magnetic recording medium according to a first embodiment of the present invention.

A constitution of a magnetic recording medium according to a first embodiment of the present invention is shown in FIG. 1. FIG. 1 is a sectional view showing a constitution of a magnetic recording medium of this embodiment. A magnetic recording medium according to this embodiment is a patterned media, and it is provided with a soft magnetic layer 4 formed on a non-magnetic substrate 2, ferromagnetic material dots 6 (hereinafter, also called "ferromagnetic material dots 6) which are formed on the soft magnetic layer 4 and separated from one another, and carbon films 8 which are respectively formed on the ferromagnetic material dots 6. The carbon film 8 is constituted such that its film face shape has a smooth curve in section and its film thickness gradually decreases from the center of the ferromagnetic material dot 6 toward an outer edge of the ferromagnetic material dot 6.

In the embodiment thus constituted, since the outer shape of the film face in section of the carbon film 8 is a smooth curve and the film thickness gradually decreases from the center of the ferromagnetic material dot 6 toward an outer edge of the ferromagnetic material dot 6, it becomes possible to prevent occurrence of spark during record writing, so that durability of the magnetic recording medium can be considerably improved. Further, since this magnetic recording medium is the patterned media, high density recording is made possible.

Figure 2:
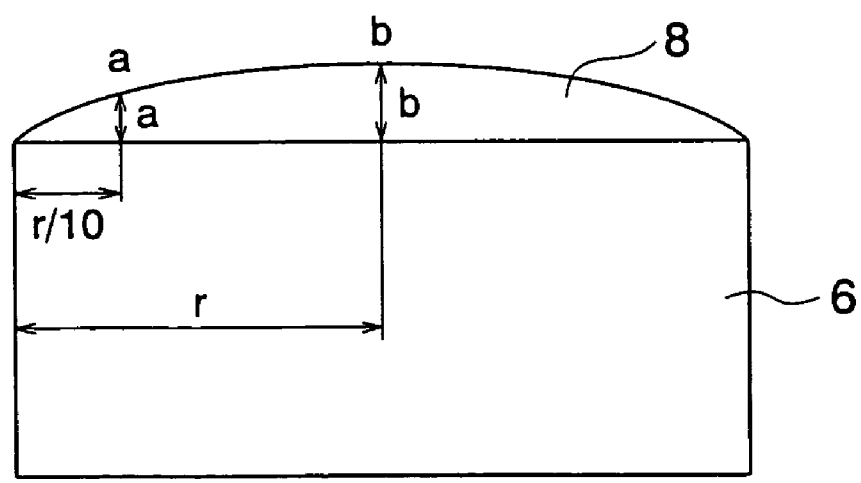
FIG. 2 is a sectional view for explaining a film thickness of a carbon film of the magnetic recording medium of the first embodiment.

In this embodiment, as shown in FIG. 2, it is preferable that a ratio (a/b) of a film thickness "a" of the carbon film 8 at a position of $1/10$ of a radius r of the ferromagnetic material dot 6 from an end portion thereof to a film thickness b at a central portion of the carbon film 8 is 0.9 or less. This fact will be explained below.

Figure 3:
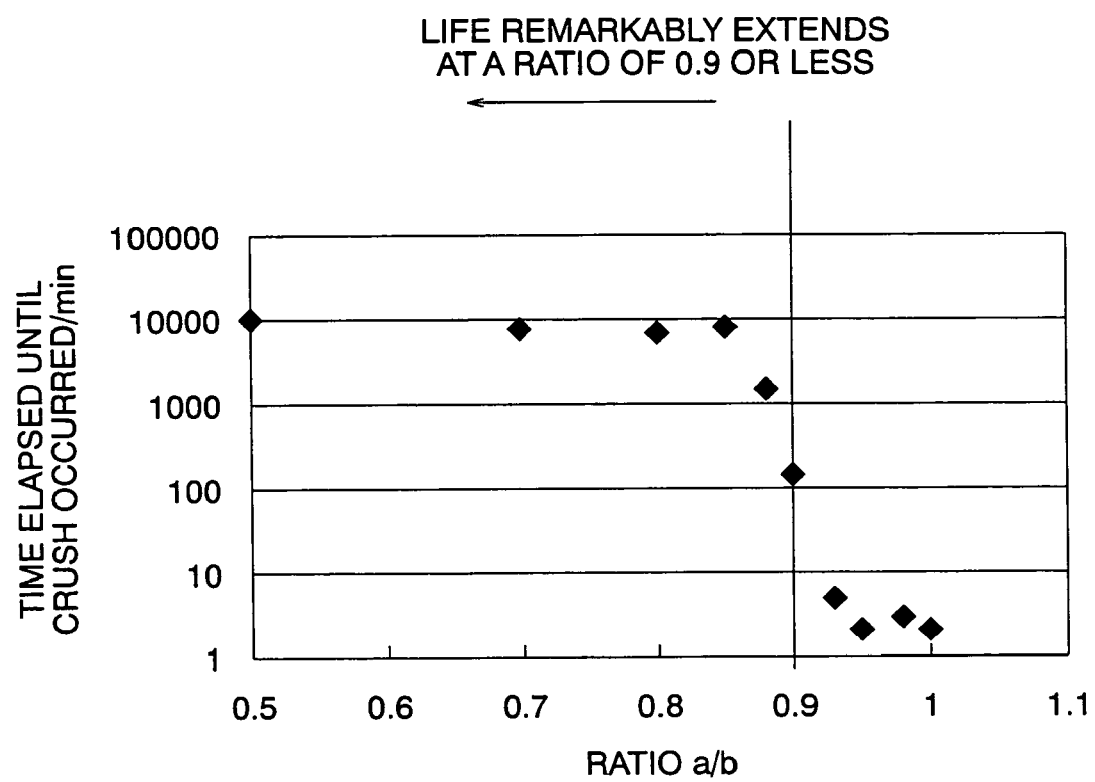
FIG. 3 is a diagram showing the results of durability tests conducted after data has been written in samples, each constituting a magnetic recording medium, having variously changed ratios of a film thickness of a carbon film in the vicinity of an end portion thereof to a film thickness of the carbon film on a central portion thereof using a floating type recording/reproducing head.

Samples constituting the magnetic recording medium, which had carbon films 8 with a smooth sectional shape and had variously changed ratios of a film thickness "a" on a predetermined position (at a position of $1/10$ of a radius r of the ferromagnetic material dot 6 from an end portion thereof) in the vicinity of an end portion of the carbon film 8 to a film thickness b of the carbon film 8 at a central portion thereof were manufactured. Then, durability tests were conducted after data was written on all the samples manufactured using a floating type recording/reproducing head, and the test result where times elapsing until recording/reproducing waveform disappears were plotted is shown in FIG. 3. From the result shown in FIG. 3, it could be clearly confirmed that the recording/reproducing head had durability of about several days to one week in samples having the ratio a/b of 0.9 or less, but it was found that the recording/reproducing head was broken in several hours in Samples having the ratio a/b of more than 0.9.

Second Embodiment

Figure 4:
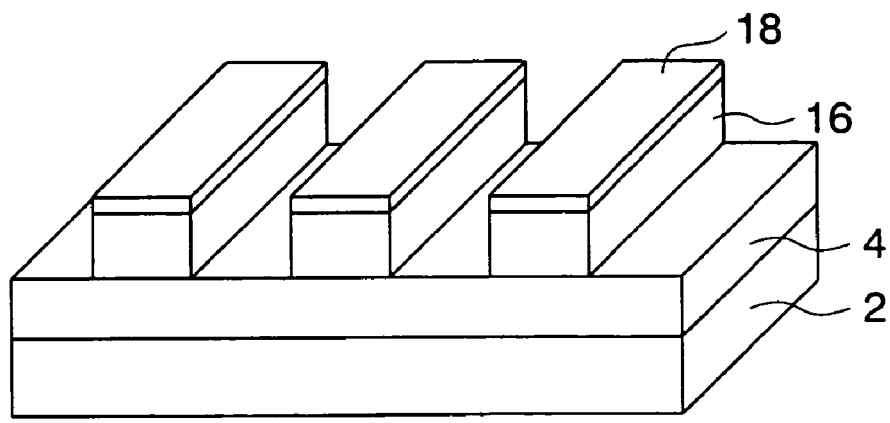
FIG. 4 is a perspective view showing a constitution of a magnetic recording medium according to a second embodiment of the present invention.

Next, a constitution of a magnetic recording medium according to a second embodiment of the present invention is shown in FIG. 4. FIG. 4 is a perspective view showing a constitution of a magnetic recording medium according to this embodiment. A magnetic recording medium according to this embodiment is a discrete track media where recording tracks are separated from one another physically, and it is provided with a soft magnetic layer 4 formed on a non-magnetic substrate 2, recording tracks 16 made of ferromagnetic material formed on the soft magnetic layer 4, and carbon films 18 formed on the recording tracks 16. In this embodiment, the magnetic material is exposed at a side face of each recording track 16, and the side face thereof is not covered with carbon.

In the conventional patterned media, since the whole surface of isolated recording layers comprising ferromagnetic material is covered with a protective film made from carbon, the surface area of the protective film made from carbon is larger than the case that the recording track is a continuous film. Therefore, when lubricant is applied, a large amount of the absorbing layer of the lubricant is formed between the protective films made from carbon, but the free layer of the lubricant is reduced on the contrary. Accordingly, when a recording/reproducing test is conducted for a long time, a capacity for self-repairing reduction/loss of the lubricant due to contacting with the recording/reproducing head is lowered, so that the life of the patterned media becomes short.

On the other hand, in this embodiment, by exposing ferromagnetic material on the side face of the recording track 16, the surface area of the carbon film 18 also serving as the protective film can be suppressed to substantially the same extent as the conventional case that the recording track is the continuous film, and the free layer of the lubricant can be formed sufficiently, which allows recording/reproducing test for a long period. As a result, durability of the magnetic recording medium can be improved remarkably. Since the magnetic recording medium is the patterned media (discrete track media), high density recording is made possible.

Figure 30:
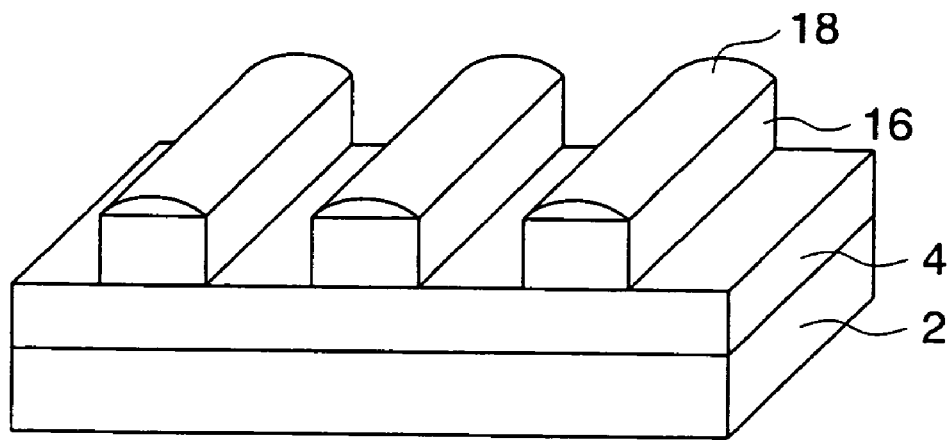
FIG. 30 is a perspective view showing a constitution of a magnetic recording medium according to a modification of the second embodiment.

Incidentally, in this embodiment, the carbon film 18 is flat, but it is preferable that an outer shape of a film face in a section in a transverse direction to the recording track 16 of the carbon film 18 has a smooth curve, like the first embodiment, and the film thickness gradually decreases from the center of the recording track 16 in a widthwise direction thereof toward the side face of the recording track 16 (refer to FIG. 30). Further, in this embodiment, like the case shown in FIG. 2 regarding the first embodiment, it is preferable that a ratio (a/b) of a film thickness "a" of the carbon film 18 at a position of 1/10 of the width of the recording track 16 from the side portion of the recording track 16 to a film thickness b of the carbon film 18 at the central portion of the recording track in the widthwise direction thereof is 0.9 or less.

Third Embodiment

Figure 5:
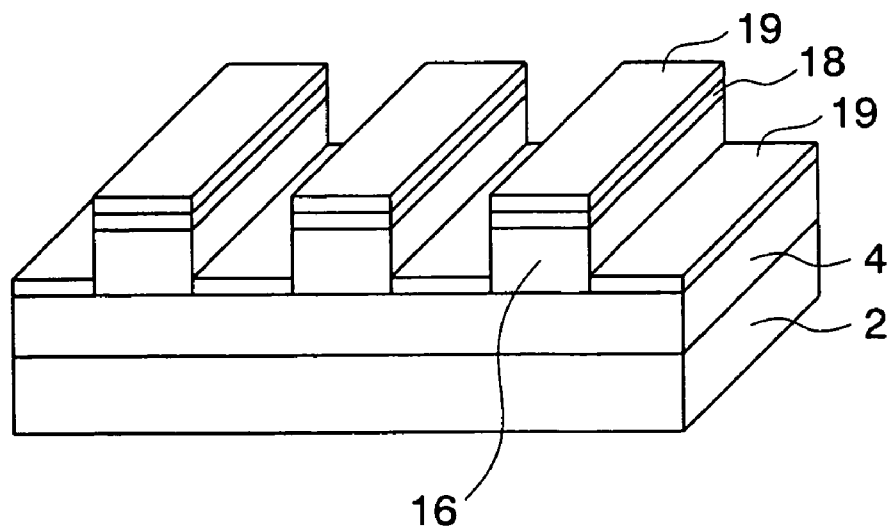
FIG. 5 is a perspective view showing a constitution of a magnetic recording medium according to a third embodiment of the present invention.

Next, a constitution of a magnetic recording medium according to a third embodiment of the present invention is shown in FIG. 5. FIG. 5 is a perspective view showing a constitution of a magnetic recording medium according to this embodiment. The magnetic recording medium according to this embodiment has such a constitution that a carbon film 19 is formed also in a groove portion (a recess) between the recording tracks 16 in the magnetic recording medium according to the second embodiment shown in FIG. 4 and the thickness of the carbon film 19 formed in the groove portion between the recording tracks 16 is made thinner than the thickness of each carbon film 18, 19 formed on the recording track 16.

In a conventional manufacturing step for a patterned media, a metal mask (a hard mask) which is difficult to be removed is mainly used. RIE (Reactive Ion Etching) of fluorocarbons ($CF_4$, $CHF_3$, $C_2F_6$ and the like) is usually used for peeling off a hard mask. In this step, a portion of the hard mask which can not be removed causes the abnormal protrusion.

Therefore, as described later, a patterned media (discrete track media) is manufactured by forming a carbon mask by RIE using oxygen to form a protective film made from carbon without removing instead of the metal mask which is difficult to be removed. Since the carbon mask 18 and the protective film 19 made from carbon are formed on a top portion of each recording track 16 made from ferromagnetic material, these members become thicker than the carbon film 19 on the recess portion. With such a constitution, an abnormal protrusion can be prevented from being formed, and durability of the patterned media (discrete track media) can be improved remarkably.

Figure 31:
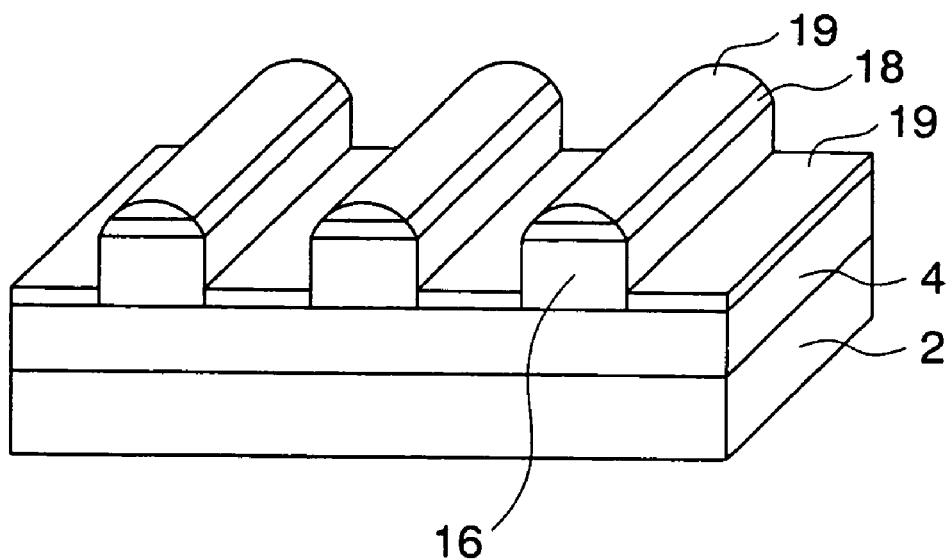
FIG. 31 is a perspective view showing a constitution of a magnetic recording medium according to a first modification of the third embodiment.

In this embodiment, the carbon films 18 and 19 formed on the top face of the recording track 16 are flat, but it is preferable that the outer shapes of the whole film faces of the carbon films 18, 19 in section of the recording track 16 in a widthwise direction thereof have smooth curves, like the case in the first embodiment and each film thickness of the layers gradually decreases from the center of the recording track 16 in a widthwise direction thereof toward a side face of the recording track 16 (refer to FIG. 31). Further, in this embodiment, like the case shown in FIG. 2 regarding the first embodiment, it is preferable that a ratio (a/b) of the whole film thickness "a" of the carbon films 18, 19 at a position of 1/10 of the width of the recording track 16 from a side portion of the recording track 16 to the whole film thickness b of the carbon films 18, 19 at the central portion of the recording track 16 in a widthwise direction thereof is 0.9 or less.

Figure 6:
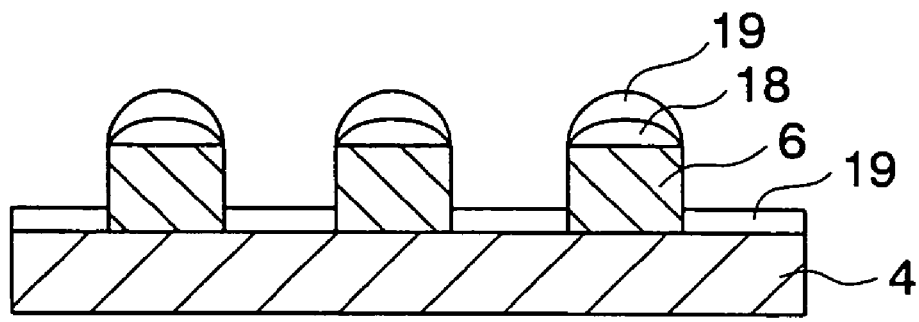
FIG. 6 is a sectional view showing a first modified embodiment of the third embodiment.
Figure 7:
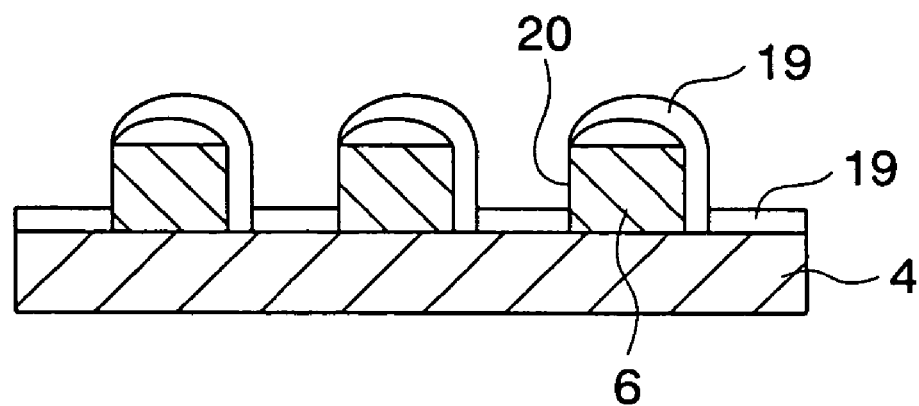
FIG. 7 is a sectional view showing a second modified embodiment of the third embodiment.
Figure 32:
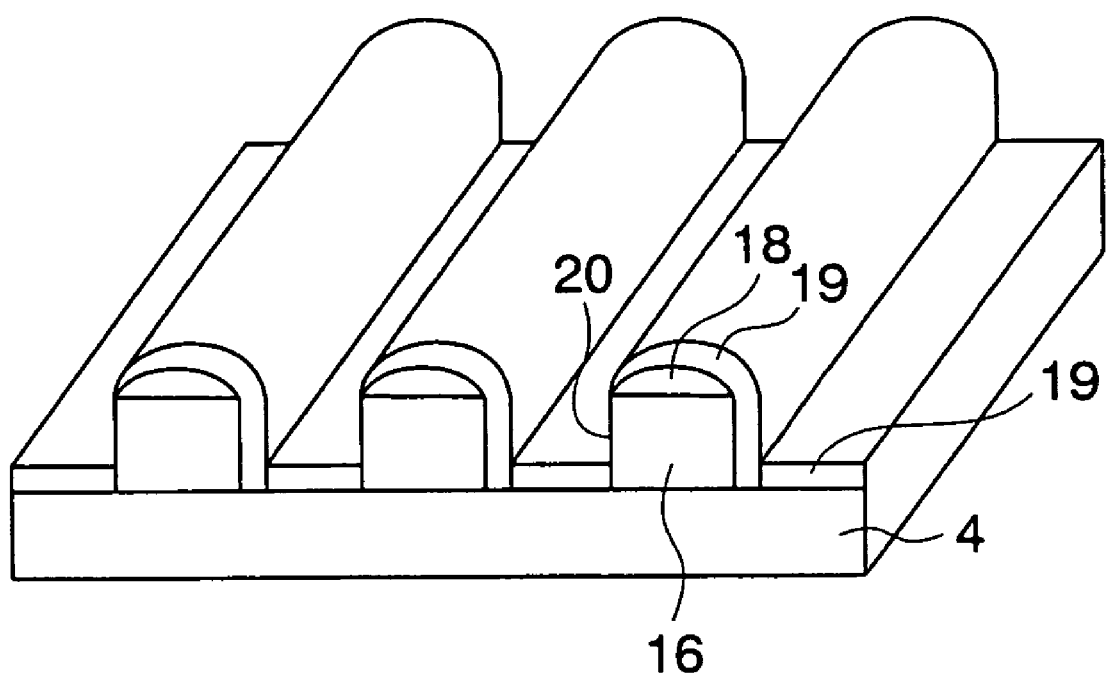
FIG. 32 is a perspective view showing a constitution of a magnetic recording medium according to a second modification of the third embodiment.

In this connection, a case that the magnetic recording medium is a patterned media having ferromagnetic material dots 6 instead of the recording tracks 16 is shown in FIG. 6. As shown in FIG. 7, even if such a constitution that a protective film 19 made from carbon is not formed on at least one directional side face 20 of each ferromagnetic material dot 6 is employed, similar advantage or effect can be achieved. In the case shown in FIG. 7, the protective film 19 made from carbon can be formed by depositing carbon in an oblique direction. In FIG. 7, the magnetic recording medium is the patterned media having the ferromagnetic material dots 6, but it may be a discrete track media having recording tracks 16 made from ferromagnetic material, as shown in FIG. 32. In this case, in FIG. 31, such a constitution that a protective film 19 made from carbon is formed on one side face of the recording track too, and no protective film made from carbon is formed on the other side face 20 is provided.

Fourth Embodiment

Next, a method for manufacturing a magnetic recording medium according to a fourth embodiment of the present invention will be explained with reference to FIG. 8 to FIG. 11. The manufacturing method of this embodiment is a working method using a nano-imprint process.

Figure 8:
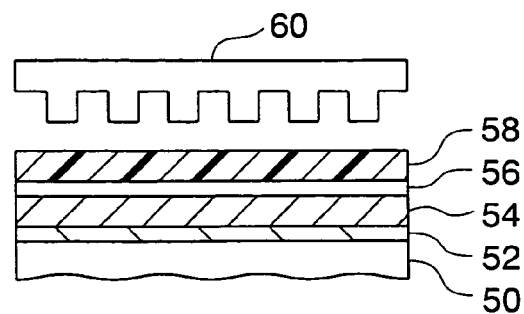
FIG. 8 is a step sectional view of a manufacturing method of a magnetic recording medium according to a fourth embodiment of the present invention.

As shown in FIG. 8, first, a soft magnetic underlying layer 52 and a ferromagnetic layer 54 are sequentially formed on a non-magnetic substrate 50 made from, for example, $SiO_2$, Si or the like. Carbon 56 is formed on the ferromagnetic layer 54. A resist layer 58 is formed on the carbon 56, and a stamper 60 formed with undulation corresponding to recording tracks, a tracking servo signal, an address information signal, a reproducing clock signal and the like is pressed on the formed resist layer 58 to transfer undulation thereon. A shape transfer process performing press using such a stamper 60 is called "an imprint process".

Figure 9:
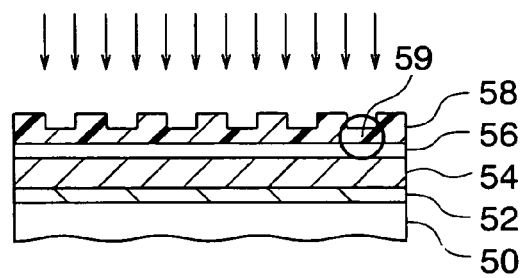
FIG. 9 is a step sectional view of a manufacturing method of a magnetic recording medium according to the fourth embodiment of the present invention.

A problem about a shape transfer conducted by the imprint process lies in that a residue (a resist remaining on a bottom portion of the recess portion) 59 remains on the resist layer 58, as shown in FIG. 9. When the magnetic layer positioned below the resist layer 58 is etched in a state that the residue 59 remains by dry etching such as RIE or Ar ion milling, a shape to be obtained deteriorates remarkably. In this embodiment, the carbon 56 has been formed on a top of the magnetic layer 54 to be etched. The residue 59 can be removed using oxygen plasma, and the carbon 56 can also be etched by oxygen plasma. The residue 59 is removed and simultaneously the carbon 56 is etched by etching using oxygen plasma with anisotropy, for example a low pressure oxygen plasma, so that a carbon hard mask 56a made from carbon is formed (refer to FIG. 10). With such a constitution, one step for processing can be omitted.

Figure 10:
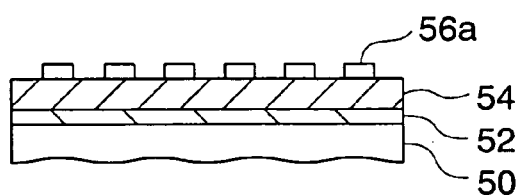
FIG. 10 is a step sectional view of a manufacturing method of a magnetic recording medium according to the fourth embodiment of the present invention.
Figure 11:
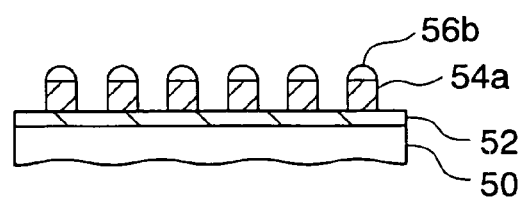
FIG. 11 is a step sectional view of a manufacturing method of a magnetic recording medium according to the fourth embodiment of the present invention.
Figure 12:
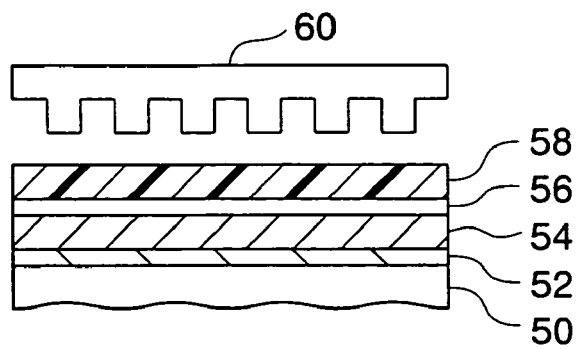
FIG. 12 is a step sectional view of a manufacturing method of a magnetic recording medium according to a fifth embodiment of the present invention.
Figure 13:
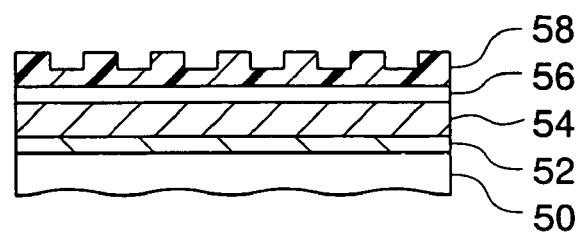
FIG. 13 is a step sectional view of a manufacturing method of a magnetic recording medium according to the fifth embodiment of the present invention.

Thereafter, as shown in FIG. 10, using dry etching such as RIE or Ar ion milling utilizing the carbon hard mask 56a as a mask, the magnetic layer 54 is patterned to form the magnetic layer 54a. When an ordinary hard mask process is performed, it is necessary to perform a hard mask removing step thereafter. A hard mask residue which could not be removed in the hard mask removing step causes an abnormal protrusion, and it constitutes a main factor of a crash of the floating type recording/reproducing head to the patterned media. In this embodiment, however, by controlling, for example, an ion incident angle of Ar ion milling, the carbon hard mask 56a is changed to a carbon 56b with a structure in which the thickness of the carbon hard mask 56a gradually decreases from the center of the upper portion of the ferromagnetic layer 54a toward an outer edge (refer to FIG. 11).

In the conventional etching, etching conditions including that the focus is placed on how to stand a pattern edge up to an angle of about 90° to make a standing angle sharp are used. In this embodiment, however, the structure described in the first embodiment can be manufactured by changing the ion incident angle from a shallow angle (for example, 30°) to a deep angle (for example, 70°) in two-stage manner or a multi-stage manner. In this connection, the ion incident angle is an angle defined between an ion incident direction and a direction perpendicular to the substrate. With such a constitution, a patterned media with a remarkably increased durability can be provided by a further simplified manufacturing method.

Fifth Embodiment

Next, a method for manufacturing a magnetic recording medium according to a fifth embodiment of the present invention will be explained with reference to FIG. 12 to FIG. 17. A manufacturing method of this embodiment forms a pattern using a nano-imprint process and reverses the pattern by charging SOG (Spin On Glass) in the formed pattern.

Like the fourth embodiment, first, a soft magnetic underlying layer 52 and a ferromagnetic layer 54 are sequentially formed on a non-magnetic substrate 50. Carbon 56 is then formed on the ferromagnetic layer 54 and a resist layer 58 is formed on the carbon 56 (refer to FIG. 12). Thereafter, a stamper 60 is pressed on the resist layer 58 to transfer undulation on the resist layer 58 (refer to FIG. 13).

Figure 14:
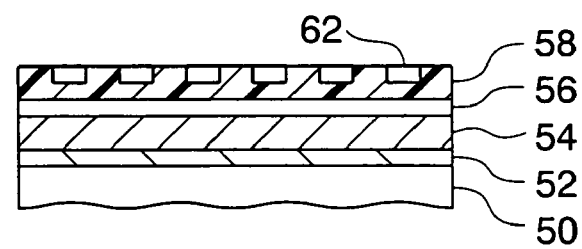
FIG. 14 is a step sectional view of a manufacturing method of a magnetic recording medium according to the fifth embodiment of the present invention.
Figure 15:
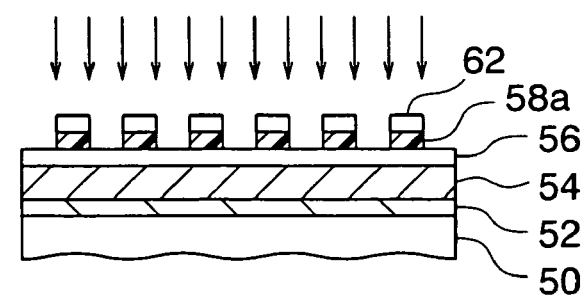
FIG. 15 is a step sectional view of a manufacturing method of a magnetic recording medium according to the fifth embodiment of the present invention.
Figure 16:
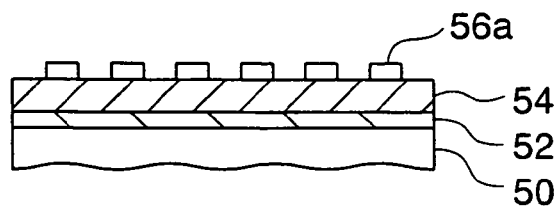
FIG. 16 is a step sectional view of a manufacturing method of a magnetic recording medium according to the fifth embodiment of the present invention.
Figure 17:
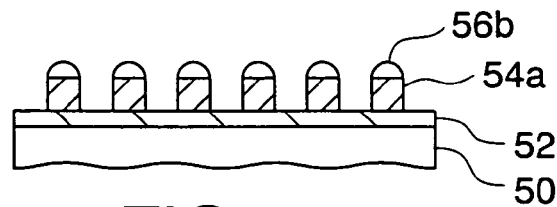
FIG. 17 is a step sectional view of a manufacturing method of a magnetic recording medium according to the fifth embodiment of the present invention.

Thereafter, the recess portions formed in the resist layer 58 are filled in an SOG 62 by applying the SOG, for example, using a spin coat process or a dip process (refer to FIG. 14). In order to make it easy to fill the SOG, the imprinted resist layer 58 may be hardened by heat processing or ultraviolet ray processing. Since the SOG has been diluted with organic solvent, filling in the hardened pattern can achieve more excellent shape transferring property.

A sample where SOG has been filled in the imprinted pattern 58 is etched by an oxygen plasma process, for example, RIE using $O_2$ gas. Since a rate selective etching ratio of SOG and an ordinary resist in RIE using oxygen gas is 70 times, a portion of the resist layer 58 except for a portion thereof which has been covered with SOG is removed, so that a resist pattern 58a is formed (refer to FIG. 15). Thereby, an etching mask comprising SOG 62 and the resist pattern 58a is formed. By performing this step, a reversed shape to the imprinted pattern can be formed and consideration about the residue of the resist layer 58 which is problematic in the imprint process is made unnecessary. Further, by utilizing a high selection ratio of the SOG and the resist, a high aspect ratio etching mask can be formed.

Then, the carbon film 56 is etched using the above etching mask to form a carbon mask 56a (refer to FIG. 16), and thereafter the etching mask is removed. Like the fifth embodiment, the magnetic layer 54 is patterned using the carbon mask 56a, so that a patterned ferromagnetic material 54a and the carbon 56b provided on the ferromagnetic material 54a are obtained. In this case, the carbon 56b has a structure that its thickness gradually decreases from the center of the top portion of the ferromagnetic layer 54a toward an outer edge (refer to FIG. 17).

With such a constitution, a patterned media with a remarkably increased durability can be formed to have a desired pattern regardless of a positive or negative shape of a stamper used for imprint.

Sixth Embodiment

Next, a method for manufacturing a magnetic recording medium according to a sixth embodiment of the present invention will be explained with reference to FIG. 18 to FIG. 22. A manufacturing method of this embodiment is for forming a pattern using a nano-imprint process to SOG. SOG is glass with liquid phase and a pattern can be directly formed by the nano-imprint process.

Figure 18:
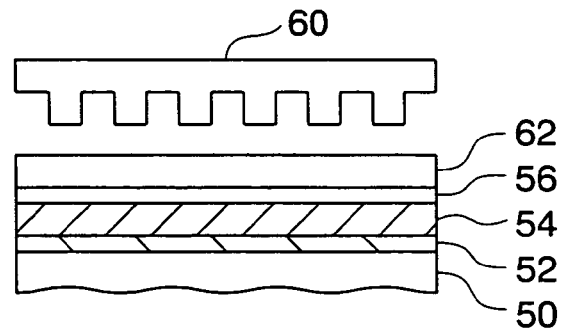
FIG. 18 is a step sectional view of a manufacturing method of a magnetic recording medium according to a sixth embodiment of the present invention.
Figure 19:
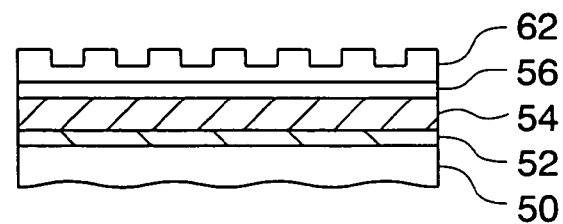
FIG. 19 is a step sectional view of a manufacturing method of a magnetic recording medium according to the sixth embodiment of the present invention.

First, a soft magnetic underlying layer 52, a ferromagnetic layer 54, and a carbon film 56 are sequentially formed on a non-magnetic substrate 50, and an SOG 62 is formed thereon by, for example, a spin coat process or a dip process (refer to FIG. 18). Thereafter, a pattern is directly formed on the SOG 62 using a stamper 60 according to an imprint process (refer to FIG. 19). At this time, residues remain in recessed portions in the SOG 62, so that the stamper 60 does not reach the carbon film 56.

Since the SOG is substance with an excellent dry-etching resistance, a pattern with a further excellent shape can be used as the etching mask. That is, in RIE using oxygen gas, since a ratio which a chemical reaction between resist and oxygen occupies in a whole reaction is large, anisotropic etching is difficult, so that an etching mask shape for etching the carbon film may deteriorate. It is easy to conduct anisotropic etching by RIE using fluorocarbon base gas ($CF_4$, $CHF_3$, $C_2F_8$ or the like). On the other hand, it is impossible to etch the resist by RIE using fluorocarbon base gas, but it is possible to use SOG.

Figure 20:
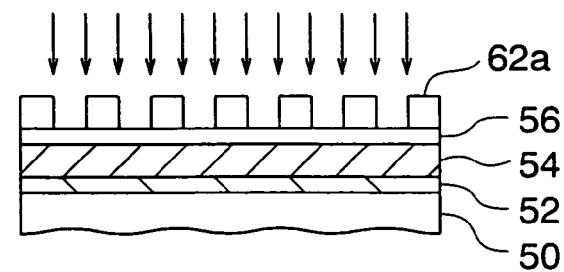
FIG. 20 is a step sectional view of a manufacturing method of a magnetic recording medium according to the sixth embodiment of the present invention.
Figure 21:
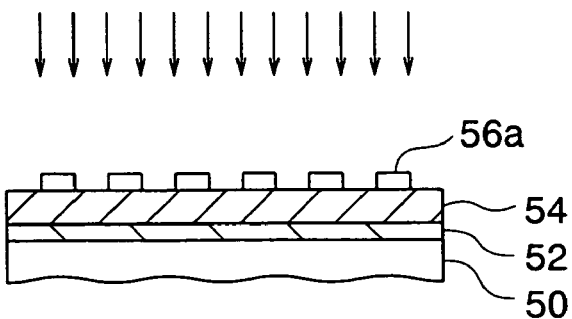
FIG. 21 is a step sectional view of a manufacturing method of a magnetic recording medium according to the sixth embodiment of the present invention.
Figure 22:
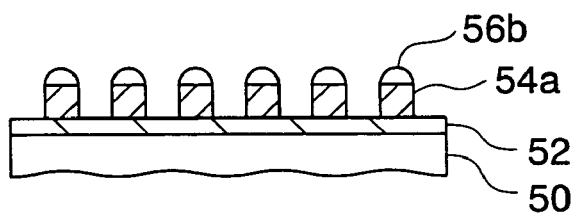
FIG. 22 is a step sectional view of a manufacturing method of a magnetic recording medium according to the sixth embodiment of the present invention.

Therefore, the SOG 62 directly patterned by the imprint process is anisotropically etched by RIE using fluorocarbon base gas so that SOG residue obtained by the imprint is removed and an etching mask 62a comprising SOG is formed (refer to FIG. 20). The carbon film 56 is patterned by using the etching mask 62a to form a carbon hard mask 56a and then the etching mask 62a is removed. RIE using oxygen gas is applied to the magnetic layer 54 using the carbon hard mask 56a like the fourth embodiment (refer to FIG. 21). Thereby, the patterned ferromagnetic material 54a and carbon 56b provided on the ferromagnetic material 54a can be obtained, as shown in FIG. 22. In this case, the carbon 56b has such a structure that its thickness gradually decreases from the center of the top portion of the ferromagnetic layer 54a toward an outer edge (refer to FIG. 22).

Of course, SOG may be applied with RIE using oxygen, but such a process may be employed such that the imprint residue is removed by the oxygen RIE and etching for the carbon film is simultaneously conducted. With such a process, durability is remarkably increased and a pattern further faithful to the pattern formed by the imprint stamper can be formed.

Before the anisotropic etching is performed by RIE using fluorocarbon base gas, an anisotropic etching step may be performed using fluoride gas.

Seventh Embodiment

Next, a method for manufacturing a magnetic recording medium according to seventh embodiment of the present invention will be explained with reference to FIG. 23 to FIG. 28. The manufacturing method of this embodiment is for forming a pattern using a self-organizing phenomenon.

Figure 23:
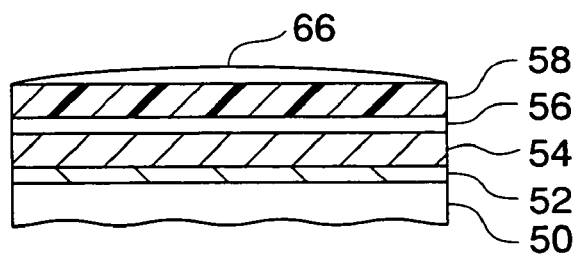
FIG. 23 is a step sectional view of a manufacturing method of a magnetic recording medium according to a seventh embodiment of the present invention.

As shown in FIG. 23, first, a underground soft magnetic layer 52, a ferromagnetic layer 54, a carbon film 56 and a resist layer 58 are sequentially formed on a non-magnetic substrate 50. For example, solution obtained by dissolving PS (polystyrene)—PMMA (polymethylmethacrylate) diblock copolymer 66 in organic solvent is formed on the resist layer 58 by a spin coat process (refer to FIG. 23).

Figure 24:
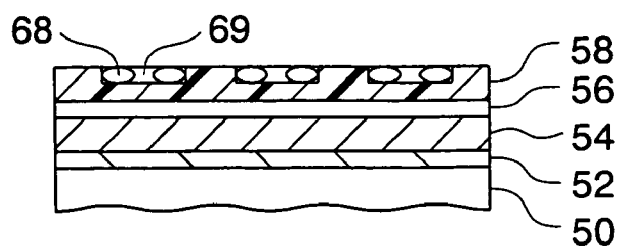
FIG. 24 is a step sectional view of a manufacturing method of a magnetic recording medium according to the seventh embodiment of the present invention.
Figure 25:
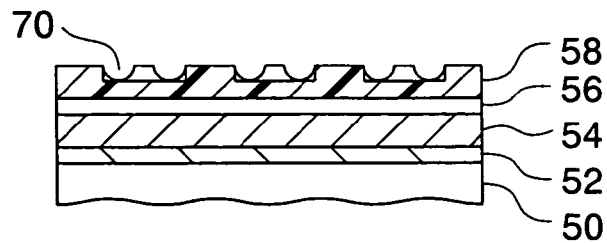
FIG. 25 is a step sectional view of a manufacturing method of a magnetic recording medium according to the seventh embodiment of the present invention.
Figure 26:
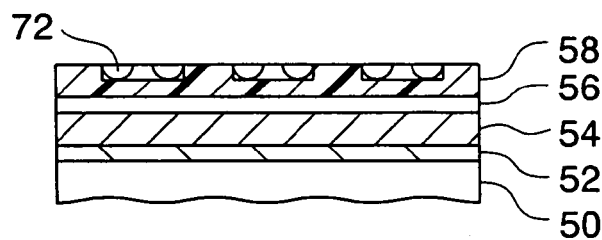
FIG. 26 is a step sectional view of a manufacturing method of a magnetic recording medium according to the seventh embodiment of the present invention.
Figure 27:
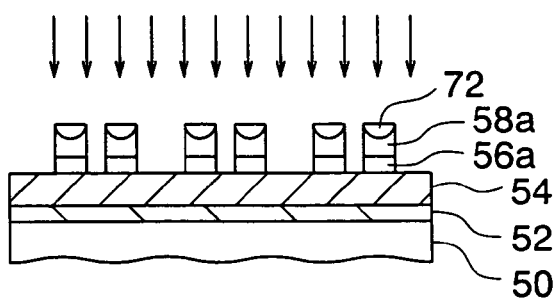
FIG. 27 is a step sectional view of a manufacturing method of a magnetic recording medium according to the seventh embodiment of the present invention.

Next, as shown in FIG. 24, the PS—PMMA diblock copolymer thin film 66 causes phase separation due to self-organization according to heat treatment of the substrate 50 conducted at a temperature of about 140° C. to 200° C., so that a sea island structure of a nanometer size is obtained. A nano-pattern forming method using the self-organizing phenomenon can form a nano-pattern with a large area at a low cost and in a short time, as compared with an ordinary pattern forming process, for example, EB rendering, photolithography, X-ray lithography, proximity field photolithography, interference exposing process, or FIB (Focused ion beam). As the diblock copolymer, one of various polymers can be used according to a desired structure (a diameter, a pitch, an etching rate). Dots 68 of PMMA with nano-meter size are arranged in a hexagonal gate shape due to the phase separation due to the self-organizing of the PS—PMMA diblock copolymer. Incidentally, reference numeral 69 in FIG. 24 denotes polystyrene.

Figure 28:
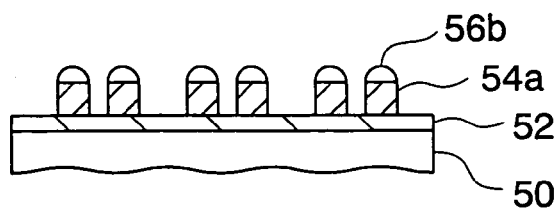
FIG. 28 is a step sectional view of a manufacturing method of a magnetic recording medium according to the seventh embodiment of the present invention.

Thereafter, only the PMMA is selectively removed by an oxygen plasma processing (for example, RIE using oxygen gas) (refer to FIG. 25), and SOG 72 is embedded in holes 70 formed by removing the PMMA. Subsequently, the resist layer 56 is patterned by RIE using oxygen gas. At this time, resist except for resist covered with the SOG 62 is removed so that a resist pattern 56a is formed. Using an etching mask comprising the resist pattern 56a and the SOG 72, the carbon film 56 is patterned by RIE using $O_2$ gas to form carbon hard mask 56a (refer to FIG. 27). Then, the etching mask comprising the resist pattern 56a and the SOG 72 is removed. Then, RIE using oxygen gas is applied to the magnetic layer 54 using the carbon hard mask 56a like the fourth embodiment. As shown in FIG. 28, a plurality of ferromagnetic material s 54a patterned and carbons 56b provided on these ferromagnetic material s 54a are obtained. In this case, each carbon 56b has such a structure that its thickness gradually decreases from the center on the top portion of the ferromagnetic layer 54a toward its outer edge (refer to FIG. 28).

With such a constitution, durability is considerably enhanced and a pattern with nano-meter size can be formed at a low cost and with a large area.

In the above embodiments, the soft magnetic layer, the ferromagnetic layer, the carbon and the self-organizing diblock copolymer are used, and materials therefor will be explained below.

(Soft Magnetic Layer)

As the soft magnetic layer, soft magnetic material including either one element of Fe, Ni and Co in composition, for example, CoFe, NiFe, CoZrNb, ferrite, ferro silicon, ferro carbon can be used. A fine structure of the soft magnetic layer is preferably a structure similar to that of the ferromagnetic layer in view of crystallization or fine structure control, but another structure can be positively employed when a magnetic property of the soft magnetic layer has priority over the other properties thereof. For example, it is considered to use a combination of amorphous soft magnetic layer and crystal ferromagnetic layer or vise versa. The soft magnetic layer may have a so-called granular structure where soft magnetic material fine particles exist in a non-magnetic material matrix, or it may be constituted of a plurality of layers with different magnetic properties (for example, a multi-layer film of soft magnetic layer/non-magnetic layer).

A direction of a magnetic anisotropy of the soft magnetic layer at a time except for recording/reproducing time may be perpendicular to film face, in a peripheral direction in plane, in a radial direction in plane or in a direction obtained by composing these directions.

The soft magnetic layer may have a coercive force with such a magnitude that a magnetic loop closed due to change of the orientation of the magnetic force (an orientation of spin) due to magnetic field of a single pole head during recording/reproducing time is formed. The coercive force is preferably several kOe or less, more preferably 1 kOe or less, and still further preferably 50 Oe or less.

(Ferromagnetic Layer)

As the ferromagnetic layer, ferromagnetic material ordinarily used for a current magnetic recording medium can be used. That is, one with large saturation magnetization Is and large magnetism anisotropy is suitable for the ferromagnetic layer. In view of this circumstances, for example, at least one selected from a group consisting of Co, Pt, Sm, Fe, Ni, Cr, Mn, Bi and Al, and alloy of these metals can be used. Among them, Co alloy with large crystal magnetism anisotropy, particularly, CoPt, SmCo or CoCr-base alloy, or ordered alloy such as FePt or CoPt is more preferable. Specifically, these alloys include Co—Cr, Co—Pt, Co—Cr—Ta, Co—Cr—Pt, Co—Cr—Ta—Pt, $Fe_{50}Pt_{50}$, $Co_{50}Pt_{50}$, $Fe_{50}Pd_{50}$, $Co_{75}Pt_{25}$ and the like. Besides, one broadly selected from rare earth metal-transition metal alloy such as Tb—Fe, Tb—Fe—Co, Tb—Co, Gd—Tb—Fe—Co, Gd—Dy—Fe—Co, Nd—Fe—Co or Nd—Tb—Fe—Co, a multi-layer film comprising a magnetic layer and a rare metal layer (artificial grating: Co/Pt, Co/Pd or the like), semi-metal such as PtMnSb, and magnetic oxide such as Co ferrite or Ba ferrite can be used.

In order to control the magnetic characteristics of the ferromagnetic layer, one obtained by alloying the above-described magnetic material and at least one element selected from Fe and Ni which are magnetic elements can be used as the ferromagnetic layer. These metals and alloys may be added with additive for improving the magnetic characteristics, for example, Cr, Nb, V, Ta, Mo, Ti, W, Hf, Cr, V In, Zn, Al, Mg, Si, B or the like, or a compound of at least one of these elements and at least one element selected from a group consisting of oxygen, nitrogen, carbon and hydrogen.

Regarding the magnetic anisotropy of the ferromagnetic layer, an in-plane magnetic anisotropic component may be included when a perpendicular magnetic anisotropic component is a main component. The thickness of the ferromagnetic layer is not limited to a specific one. However, in order to achieve high density recording, the thickness is preferably 100 nm or less, more preferably 50 nm or less, and still more preferably 20 nm or less. Incidentally, when the thickness is 0.1 nm or less, it become difficult to form a continuous thin film, which is undesirable.

It is preferable that the ferromagnetic layer is made from a composite material constituted of magnetic particles and non-magnetic material among them. This is because high density magnetic recording where the magnetic particles serve as reversal units becomes possible. However, when a recording region is patterned, presence of the non-magnetic material is not required necessarily, and the ferromagnetic layer may be made of a continuous amorphous magnetic material such as rare earth metal-transition metal alloy.

(Carbon)

The carbons can be classified to sp2 bond carbon (graphite) and sp3 bond carbon (diamond). The sp3 bond carbon is superior in durability and corrosion resistance to the sp2 bond carbon, but since the former is crystalline, it is inferior to the graphite in surface smoothness. A film of carbon is usually formed by a sputtering process using graphite target. In this process, amorphous carbon including the sp2 bond carbon and the sp3 bond carbon in a mixed manner is formed. Carbon having a large ratio of the sp3 bond carbon is called "diamond like carbon (DLC)". Since this DLC is excellent in durability and corrosion resistance and it is excellent in surface smoothness due to its amorphous structure, it is utilized as a surface protective film for a magnetic recording medium. Film formation of the DLC conducted by CVD (chemical vapor deposition) process can form DLC further rich in sp3 bond carbon according to proper setting of conditions for film formation, since the DLC is produced by exciting and decomposing material gas in plasma, and causing chemical reaction.

(Self-Organization: Diblock Copolymer)

The diblock copolymer is copolymer comprising normal chain polymers including a plurality of single polymers as partial constituent components (blocks). For example, a polymer chains A and B have such a structure as —(AA··AA)—(BB··BB)—. The block copolymer takes a phase separation structure including A phase where polymers A aggregate and B phase where polymers B aggregate by applying heat treatment on the block copolymer. For example, the phase separation structure includes a "lamella" structure where A phase and B phase regularly appear alternately, a "cylinder" structure where one phase is formed in a rod shape, and an "sea island" structure where one phases are distributed in a spherical shape. In order to form a micro phase separation structure with the block copolymers, a volume fraction of two phases becomes important. Any polymer can be selected as the polymer A and the polymer B, but the polymer A and the polymer B are preferably selected such that a difference in dry etching rate therebetween is large in view of lithography. A combination of aromatic polymer with a relatively high etching resistance (for example, polystyrene, polyvinyl naphthalene, poly-α-methylstyrene, polyvinyl pyridine and the like) and acrylic polymer with a fast dry etching rate (for example, PMMA, polymethylmetacrylate and the like) may be preferably used. In a case of diblock copolymer of PS (polystyrene) and PMMA bonded, it is possible to selectively remove only PMMA utilizing a large difference in dry etching resistance. A diblock copolymer of PS and polyvinyl pyridine form is phase-separated in a clear island structure, but since there is hardly a difference in dry etching resistance between the both, it is difficult to utilize such a phase separation structure as an etching mask. The size (dot diameter, pitch) of the phase separation structure can be controlled with molecular weights of the polymer A and the polymer B. For example, in a diblock copolymer of PS—PMMA, the diameter and pitch of PMMA dot can be set to 40 nm and 80 nm by making the molecular weights of PS and PMMA to 172000 and 41500 respectively. The phase separation structure can be reduced by decreasing the molecular weights. For example, by making the molecular weights of PS and PMMA to 43000 and 10000, respectively, the diameter and the pitch of PMMA dot can be set to 10 nm and 29 nm.

Next, Examples of the present invention will be explained.

EXAMPLES

Example 1

CoZrNb with a film thickness of 200 nm constituting a soft magnetic layer was formed on a glass substrate. Then, CoCrPt alloy with a thickness of 15 nm was formed as a ferromagnetic layer, and carbon with a thickness of 20 nm was formed thereon by CVD process. Thereafter, after a resist with a film thickness of 50 nm was formed, undulation was formed by a nano-imprint process using a Ni stamper with a whole surface on which a land/group pattern with a pitch of 400 nm and a land portion of 200 nm was formed by Deep UV cutting process. Subsequently, imprint residue was removed by weak RIE of 100 w using oxygen gas, and the carbon film was etched using strong RIE of 200 W, so that a carbon hard mask was formed. Thereafter, a patterned media (discrete track media) was obtained by etching the CoCrPt alloy, which was the ferromagnetic layer, by a thickness of 15 nm by using Ar ion milling.

An etching process where an ion incident angle was gradually varied from a vertical direction to a substrate in a longitudinal direction thereof was performed on the carbon film serving as the hard mask such that the thickness of the carbon film gradually decreased toward its end portion. A structure shown in FIG. 1 was confirmed with a cross sectional TEM (Transmission Electron Microscope). That is, a film thickness of the carbon film was 5 nm, and a film thickness of the carbon film positioned at an end portion of the carbon film, namely, at a position of 1/10 of a radius of a ferromagnetic material dot from an end portion was 3.5 nm. A height of the CoCrPt of the ferromagnetic layer was 15 nm, and the CoZrNb which was the soft magnetic layer was exposed at the groove portion. It was found by measuring a magnetization curve (Kerr hysteresis loop) using magnetro-optical Kerr effect that a coercive force of the ferromagnetic layer was 4000 Oe.

Application of lubricant was performed and a durability test was conducted by a floating type recording/reproducing head operated with a floating amount of 12 nm and at a rotating speed of 4200 rpm. As a result, a clear reproduced waveform can be observed even after one week elapsed.

Comparative Example 1

A patterned media was manufactured in a common process. That is, CoZrNb with a film thickness of 200 nm serving as a soft magnetic layer was formed on a glass substrate. Subsequently, CoCrPt alloy with a film thickness of 15 nm serving as a ferromagnetic layer was formed on the CoZrNb using sputter deposition, and then resist with a film thickness of 50 nm was formed. Subsequently, patterning was conducted by imprint process using the Ni stamper used in Example 1, and imprint residue was removed by oxygen RIE. After a magnetic layer was etched using Ar ion milling, the resist was peeled off so that a carbon protective film with a thickness of 5 nm was formed. That is, the patterned media was manufactured.

Application of lubricant was performed and a durability test was conducted by a floating type recording/reproducing head operated with a floating amount of 12 nm and at a rotating speed of 4200 rpm. As a result, a reproduced waveform began to attenuate and a reproduced waveform could not be observed at all after several minutes elapsed therefrom.

Example 2

In Example 1, samples with such a structure that a film thickness "a" of an end portion of the carbon film decreased as compared with a film thickness b at a central portion thereof were manufactured while conditions were being changed. Regarding all the samples, a durability test was conducted using a floating type recording/reproducing head, and ratios a/b and times elapsing until a recording/reproducing waveform was not observed were plotted. As shown in FIG. 3, a clear threshold value was found. That is, regarding samples with a ratio a/b of 0.9 or less, durability over about several days to one week was confirmed, but it was found that the recording/reproducing head was broken regarding samples with a ratio a/b of 0.9 or more.

Example 3

Figure 29:
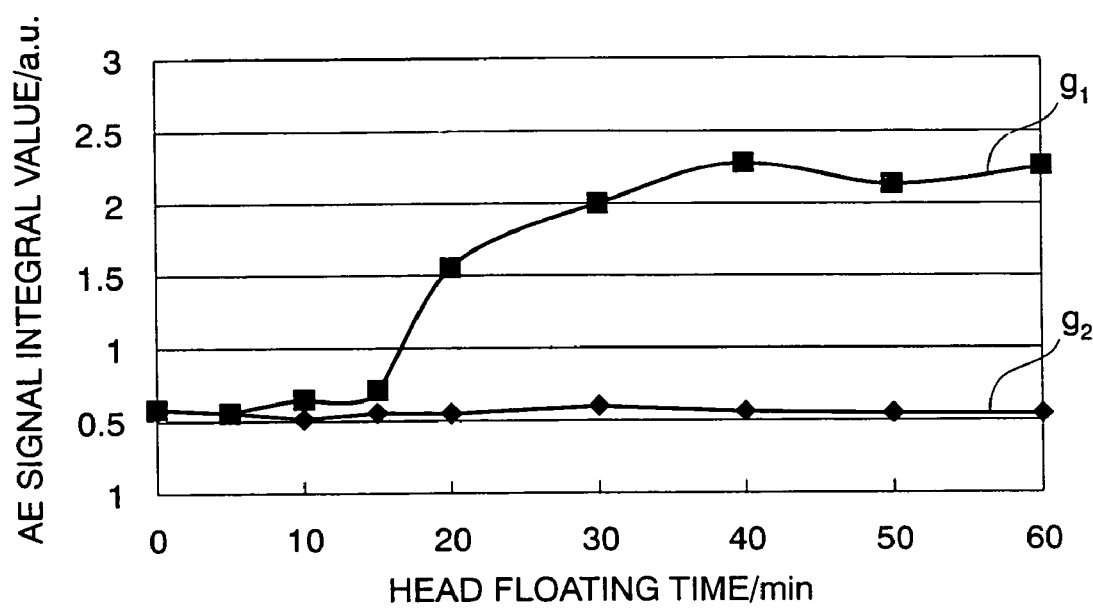
FIG. 29 is a diagram for explaining characteristics of an Example of the present invention and Comparative Example.

When the conventional patterned media manufactured in Comparative Example 1 was tested using a floating type head, the floating type head was attached with an AE (Acoustic Emission) sensor, and integral values were plotted regarding time, so that a graph g1 shown in FIG. 29 was obtained. That is, a noise output began to increase after about 15 minutes elapsed from a test start. This means such a fact that a free layer portion in lubricant is poor. It was found that replenishment could not be performed to decrease of lubricant caused by pin off due to a centrifugal force or a head contact.

On the other hand, samples manufactured in Example 1 were measured in the same manner and a graph g2 shown in FIG. 29 was obtained. A noise output of the AE sensor hardly changed, and it was found that sufficient replenishment to decrease of lubricant could be made.

As explained above, according to each embodiment of the present invention, a magnetic recording medium which allows high density recording and has excellent durability can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

The invention claimed is:

1. A magnetic recording medium comprising:
a plurality of ferromagnetic material dots arranged on a soft magnetic layer formed on a non-magnetic substrate so as to be separated from one another; and
carbon films which are formed on the respective ferromagnetic material dots, each carbon film having a smooth film face shape in a section passing through the center of each ferromagnetic material dot and a film thickness gradually decreasing from the center of the ferromagnetic material dot toward an outer edge thereof,
wherein a ratio of a film thickness of the carbon film at a position of $1/10$ of a radius of the ferromagnetic material dot from an end portion of the ferromagnetic material dot to a film thickness at a central portion of the carbon film is 0.9 or less.

2. A magnetic recording medium according to claim 1, wherein a carbon film is formed on a soft magnetic layer among the plurality of ferromagnetic material dots, and a film thickness on the carbon film formed on the ferromagnetic material dot is thicker than a film thickness of the carbon film formed on the soft magnetic layer among the plurality of ferromagnetic material dots.

3. A magnetic recording medium according to claim 2, wherein each of the plurality of ferromagnetic material dots is provided with a carbon film formed on one side thereof.

4. A magnetic recording medium according to claim 1, wherein each of the ferromagnetic material dots is formed from ferromagnetic material including at least one selected from a group consisting of Co, Pt, Sm, Fe, Ni, Cr, Mn, Bi and Al, and alloy of these metals.

5. A method of manufacturing the magnetic recording medium of claim 1 comprising:
forming a ferromagnetic layer on a soft magnetic layer formed on a non-magnetic substrate;
forming a mask comprising carbon on the ferromagnetic layer; and
performing ion milling with controlled ion incidental angle on the ferromagnetic layer using said mask comprising said carbon.

6. A method according to claim 5, where the ion milling is performed while the ion incidental angle is changed from a shallow angle to a deep angle in a multi-stage manner.

7. A magnetic recording medium comprising:
a plurality of recording tracks which are provided on a soft magnetic layer formed on a non-magnetic substrate so as to be separated from one another, each of the tracks with convex shape in a widthwise section being formed of ferromagnetic material; and
carbon films which are formed on the respective recording tracks, wherein:
ferromagnetic material is exposed at a side portion of each of the recording tracks;
each of the carbon films has a smooth film face shape in a section taken along a width of the recording track and a film thickness gradually decreasing from the center of the width of the track toward an outer edge of the recording track; and
a ratio of a film thickness of the carbon film at a position of $1/10$ of a width of the recording track from a side portion of the recording track to a film thickness of the carbon film at a central portion of the width of the recording track is 0.9 or less.

8. A magnetic recording medium according to claim 7, wherein a carbon film is formed also on a soft magnetic layer between the plurality of recording tracks, and a film thickness of the carbon film formed on an top face of the recording track is thicker than a film thickness of the carbon film formed on the soft magnetic layer between the plurality of recording tracks.

9. A magnetic recording medium according to claim 8, wherein each of the plurality of recording tracks is provided with a carbon film formed on one side thereof.

10. A magnetic recording medium according to claim 7, wherein each of the recording tracks is formed from ferromagnetic material including at least one selected from a group consisting of Co, Pt, Sm, Fe, Ni, Cr, Mn, Bi and Al, and alloy of these metals.

11. A magnetic recording medium according to claim 7, wherein a thickness of the recording track is a value of 0.1 nm or more and 100 nm or less.

12. A method of manufacturing the magnetic recording medium of claim 7 comprising:
- forming a ferromagnetic layer on a soft magnetic layer formed on a non-magnetic substrate;
- forming a mask comprising carbon on the ferromagnetic layer; and
- performing ion milling with controlled ion incidental angle on the ferromagnetic layer using said mask comprising said carbon.

13. A method according to claim 12, where the ion milling is performed while the ion incidental angle is changed from a shallow angle to a deep angle in a multi-stage manner.

* * * * *